April 2, 1963   D. DOMINA   3,083,994
ROOF STRUCTURE FOR TRACTORS AND THE LIKE
Filed July 12, 1960   2 Sheets-Sheet 1

INVENTOR:
DELFRIED DOMINA
BY Michael S. Striker
his ATTORNEY

April 2, 1963 D. DOMINA 3,083,994
ROOF STRUCTURE FOR TRACTORS AND THE LIKE
Filed July 12, 1960 2 Sheets-Sheet 2

INVENTOR:
DELFRIED DOMINA
BY
his ATTORNEY

United States Patent Office 3,083,994
Patented Apr. 2, 1963

3,083,994
ROOF STRUCTURE FOR TRACTORS
AND THE LIKE
Delfried Domina, Grosshelfendorf, near Munich, Germany, assignor to Georg Fritzmeier, Grosshelfendorf, near Munich, Germany
Filed July 12, 1960, Ser. No. 42,349
Claims priority, application Germany July 28, 1959
10 Claims. (Cl. 296—107)

The present invention relates to roof structures for tractors and the like. More particularly, the invention relates to a roof structure which may be moved into and from a shielding position above the driver's seat in a tractor, and which may be readily installed on tractors or similar conveyances of presently known design.

An important object of the invention is to provide a very simple, inexpensive and practical cover or roof structure for the driver's seat in a tractor which is constructed and assembled in such a way that it may be readily moved into any desired position, either before or while the tractor is in motion, and which may remain in any desired position of adjustment without requiring special fastening means therefor.

Another important object of the invention is to provide a combined roof and windshield structure for a tractor or a like vehicle which is constructed and assembled in such a way that the driver may enter his seat from the side, from the rear or from the front, depending on the momentary position of the combined structure.

A further object of the instant invention is to provide a roof structure of the above outlined characteristics which consists of a small number of component parts, which may be readily attached to or separated from the tractor, and whose roof member may be moved into any number of desired positions such as are most suited to protect a driver from the elements, i.e. rain, snow, sun or wind.

An additional object of the invention is to provide a roof structure of the above outlined type which is constructed and assembled in such a way that the rattling is reduced to a minimum even if the vehicle is driven on uneven terrain.

Still another object of the invention is to provide a combined roof and windshield structure for tractors and other types of vehicles which may be at least partially concealed when not in actual use.

With the above objects in view, the invention resides in the provision of a roof structure which comprises essentially a pair of spaced arcuate frame members disposed in two parallel planes and having their ends secured to the chassis at the opposite sides of a driver's seat in a tractor or the like, and a roof member which comprises guide means slidably engaging with each of the frame members so that the roof member is shiftable in an arc into and from a position above the driver's seat.

In accordance with a feature of my invention, the roof member may be connected with a windshield member, and the latter may be provided with its own guide means engaging with the frame members to insure proper guidance of the combined roof and windshield members. The guide means for these members may assume the form of arcuate tubular sleeves slidably surrounding the respective frame members and having a curvature equal to the curvature of the frame members. Alternately, the guide means may assume the form of pairwise arranged, preferably elastic rollers which engage the opposite sides of the respective frame members and are carried by brackets secured to the roof member and to the windshield member.

The frame members preferably extend through an arc between about 180 and 270 degrees. The arrangement may be such that the windshield member is movable into a position directly above the driver's seat or even rearwardly of the driver's seat so that a person desiring to enter the seat from the front end of the vehicle can do so without any interference by the windshield. Of course, the access to the driver's seat from the front end of a vehicle is even more convenient if the roof structure does not comprise a distinct windshield member. In such instances, a person may enter the driver's seat from the front end even if the frame members extend through comparatively small arcs of say 180 degrees or thereabouts. As is known, a tractor often comprises a number of attachments and other superstructures which are disposed behind the driver's seat so that it is rather difficult to enter the seat from the rear side. The provision of my improved roof member which is movable in an arc above the driver's seat represents an ideal solution to this problem.

The novel features which are considered as characteristic for the invention are set forth in particular in the appended claims. The invention itself, however, both as to its construction and its method of operation, together with adidtional objects and advantages thereof, will be best understood from the following detailed description of certain specific embodiments when read in connection with the accompanying drawings, in which:

Figure 1:
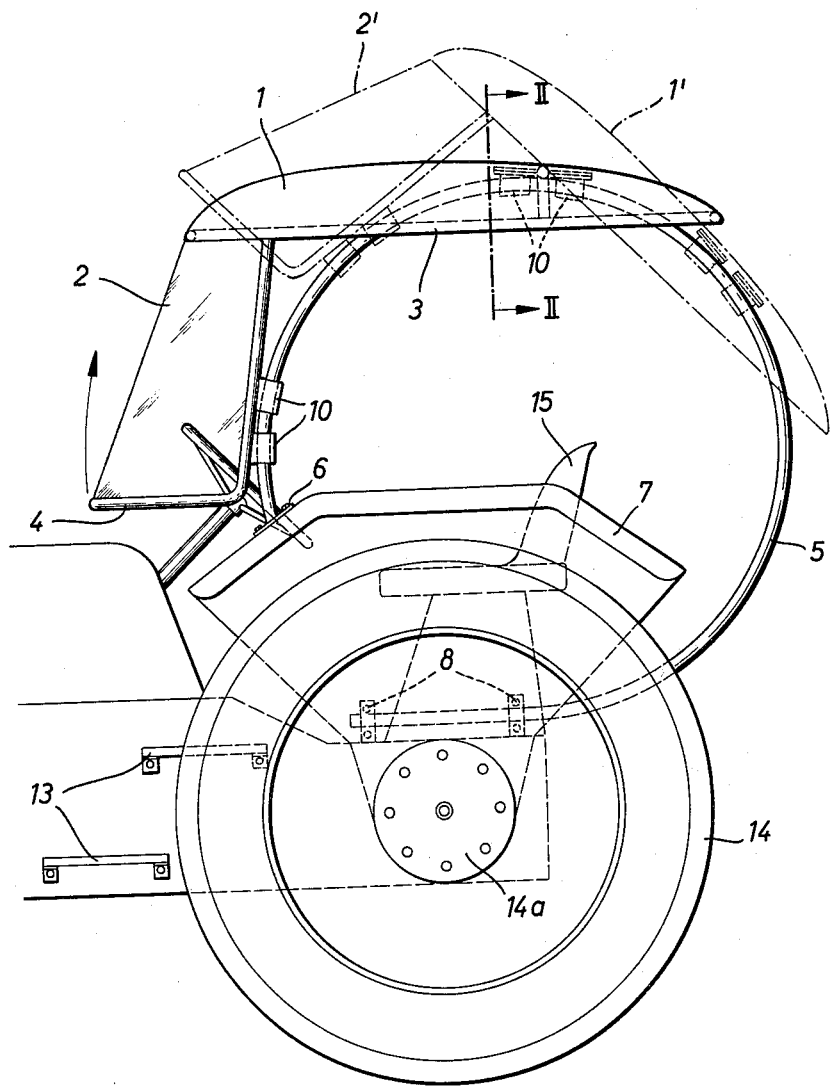
FIG. 1 is a somewhat schematic fragmentary side elevational view of a vehicle provided with the improved roof structure embodying my invention.

Referring now in greater detail to the illustrated embodiments, and first to FIG. 1, there is shown the rear wheel 14 of a tractor or a similar vehicle whose upper portion is shielded by a suitable fender or mudguard 7. This fender forms part of the chassis and serves as a means for supporting one half of a frame for the shiftable roof member 1. The frame comprises two arcuate frame members 5 (only one shown in FIG. 1), preferably of tubular stock (e.g. metallic pipes), whose ends are connected to the respective fenders 7. The forward end of each frame member 5 is provided with a plate 6 which is riveted, screwed, welded or otherwise rigidly connected with the upper front side of the respective fender 7. The rear end of the frame member 5 is secured to the inner or to the outer side of the adjacent fender 7, as by two clamps 8 or the like, these clamps being shown connected with the fender in close proximity of the rear axle 14a. In the illustrated embodiment, the frame member 5 describes an arc of approximately 270 degrees though it is equally possible to shape the frame member in such a way that it will describe an arc of say 180 degrees or of even more than 270 degrees.

Figure 2:
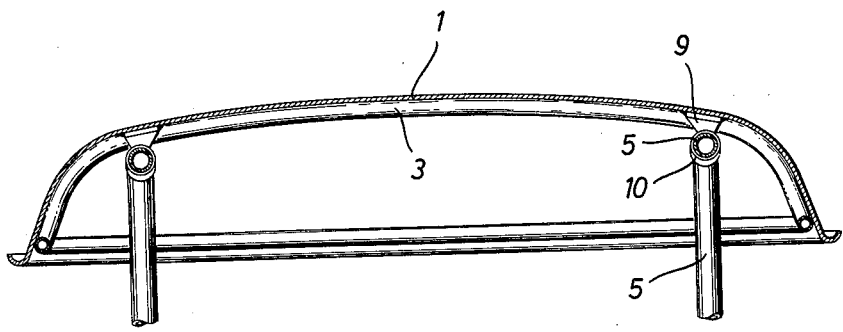
FIG. 2 is a transverse section taken along the line II—II of FIG. 1, as seen in the direction of arrows, showing one form of guide means for the roof member and the windshield member.

The frame members 5 slidably support a roof member 1 which carries suitable brackets 9 (see FIG. 2) serving as a means for supporting pairwise arranged arcuate tubular guides 10 whose curvature preferably equals the curvature of the tubular members 5. As shown in FIGS. 1 and 2, each tubular guide 10 slidably receives the respective frame member 5 so that the roof member 1 may be readily shifted in an arc between its shielding position in which it is located above the seat 15 of the tractor, and a rear position in which it is located behind the seat 15 so that a driver is fully exposed if he so desires.

The radius of curvature of each frame member 5 may but need not be constant, i.e. though the frame members may extend in an arc which forms part of a circle, they may be curved in a different way and, if desired, may even comprise straight portions. As is shown in FIG. 1, the portion of the frame member 5 adjacent to the clamps 8 is straight while the remaining portion of the member 5 extends through about 270 degrees along the periphery of a circle.

The roof member 1 may but need not be combined with a windshield member 2 whose frame 4 carries additional guides 10 of tubular stock so that the windshield member 2 may be guided along the frame members 5 in the same way as the roof member 1. The members 1, 2 may be moved in unison and, to that end, preferably constitute a rigidly assembly unit which reduces the likelihood of rattling when the vehicle is in motion. It will be noted that, in contrast to conventional cover structures which utilize articulately connected links for a collapsible roof member, the members 1 and 2 of FIG. 1 constitute a rigid unit which has no relatively movable parts and, therefore, is much simpler and may be manufactured at a lower initial cost.

The frame members 5 normally consist of metallic stock, as well as the guides 10 and the frames 3 and 4. As is shown in FIG. 2, the frame members 5 extend in two vertical planes which are parallel with each other as well as with the longitudinal central plane A—B of the vehicle, i.e. the frames 5 are disposed in mirror reverse with respect to the plane A—B.

The roof member 1 may consist of sheet metal, of a suitable plastic, or of a textile material, e.g. heavy canvas or the like. In the latter instance, the roof member comprises a rigid frame 3 which also supports the brackets 9. Such brackets are not needed on the windshield member 2 because the guides 10 of this windshield member may be connected directly with the frame 4. Of course, when the roof member 1 consists of sheet metal or the like, the brackets 9 may be directly welded, bolted or riveted thereto.

Figure 3:
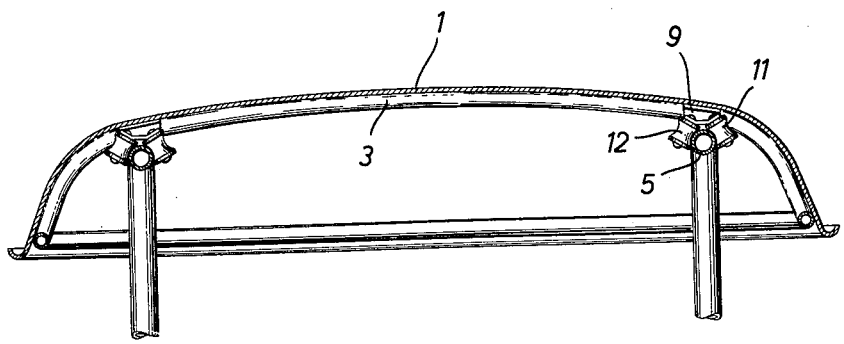
FIG. 3 is a similar fragmentary sectional view of modified guide means for the roof member.

Referring now to FIG. 3, it will be seen that the tubular guides 10 are replaced by pairwise arranged rollers 11, 12 which engage the opposite sides of the frame members 5 so as to prevent a separation of the roof member 1 from the frame members. The rollers 11, 12 are of concave shape, their curvature corresponding to the curvature of the cylindrical frame members 5, and the rollers may consist of a resilient material, e.g. hard rubber or the like. The use of elastic rollers 11, 12 contributes to a reduction in noise not only when the vehicle is actually driven but also when the roof member 1 is shifted in an arc along the frame members. When the vehicle is driven, the high-frequency vibrations normally generated by a moving conveyance cannot be transferred to the roof member 1 and/or to the windshield member 2 if the rollers 11, 12 consist of a resilient material.

Referring back to FIG. 1, the roof member 1 assumes its full-line position when the driver desires to be protected from rain, snow, sleet or from the sun. The windshield then also assumes its full-line position and its transparent or translucent portion, which may consist of unbreakable glass or of a suitable synthetic plastic material, in no way obscures the driver's vision. The weight of combined members 1, 2 is normally sufficient to maintain these members in the position of FIG. 1 in which the frame 4 of the windshield member 1 rests on the fenders 7. Also, there is preferably enough friction between the guides 10 or 11, 12 and the tubular frame members 5 to insure that the members 1, 2 will remain in any intermediate position of adjustment, i.e. even in positions in which they do not actually contact the fenders 7 or another part of the chassis.

If the driver desires to enter his seat from the front end of the vehicle, i.e. from the left-hand side of FIG. 1, the members 1, 2 are moved to the rear to assume the phantom-line positions 1', 2' whereupon the driver is free to ascend the steps 13 which may be connected to the fender 7 or to any other sufficiently sturdy part of the vehicle so that the driver may conveniently reach the seat 15 or to descend from the seat again in a direction to the front end of the vehicle. Of course, it will be readily understood that the members 1, 2 may be moved rearwardly and beyond their phantom line positions 1', 2' so that the rear end of the roof member may come into abutment with a part of the vehicle e.g. with the fenders 7 when the combined members 1, 2 reach their rear end position. If the driver so desires, he may push the members 1, 2 into the positions 1', 2', respectively, even when the vehicle is actually driven, for example, if he desires to be exposed to the sun. Furthermore, since the combined members 1, 2 may assume a number of intermediate positions, the driver may adjust the same so as to protect himself from rain coming from a lateral direction or from the rear.

Of course, the tubular guides may be provided with suitable locking means for rigidly securing the same to the frame members 5 in a selected position, but it is normally considered sufficient to hold the members 1, 2 in such selected position merely by friction existing between the guides and the frame members.

The frame members 5 may be readily detached from the fenders 7 so as to permit complete separation of the roof structure from a vehicle. For example, the roof structure may be conveniently transferred from one to another tractor, and may be readily connected to tractors and like vehicles of any conventional design. It will be readily understood that the roof member 1 may be provided with laterally extending flaps to further protect the driver from bad weather conditions. Such lateral flaps may be detachably connected to the frame 3, if desired.

Particularly if the frame members 5 consist of tubular stock, they exhibit sufficient resiliency so that no separate means for resiliently mounting the roof member 1 and/or the windshield member 2 are considered necessary.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a roof structure for the driver's seats of tractors and the like, in combination, a pair of spaced arcuate frame members of identical curvature, said frame members disposed in parallel planes; and a roof member comprising guide means slidably engaging with and at least partially surrounding each of said frame members.

2. A roof structure for the driver's seats of tractors and the like, said structure comprising, in combination, a pair of spaced arcuate frame members of identical curvature, said frame members disposed in parallel planes; a roof member comprising guide means slidably engaging with each of said frame members; and windshield means slidable with said roof member along said frame members to a position in which the seat is accessible from the front side of the tractor.

3. A roof structure for the driver's seats of tractors and the like, said structure comprising, in combination, a pair of spaced arcuate frame members of identical curvature, said frame members disposed in parallel planes; a roof member comprising guide means slidably engaging with each of said frame members; and a windshield member comprising guide means slidably engaging with each of said frame members, said windshield member connected to and movable with said roof member along said frame members to a position in which the seat is accessible from the front side of the tractor.

4. A roof structure for the driver's seats of tractors and the like, said structure comprising, in combination, a pair of spaced arcuate frame members of identical curvature, said frame members disposed in two parallel vertical planes; a roof member comprising first arcuate tubular guide means surrounding and slidably engaging with each of said frame members; and a windshield member connected with said roof member and comprising second arcuate tubular guide means surrounding and slidably engaging with each of said frame members, the curvature of said first and second guide means equal to the curvature of said frame members whereby the frame member and the windshield member are shiftable along said frame members to a position in which the seat is accessible from the front side of the tractor.

5. In a roof structure for the driver's seats of tractors and the like, in combination, a pair of spaced arcuate frame members of identical curvature, said frame members consisting of tubular stock and disposed in parallel planes; and a roof member comprising guide means at least partially surrounding and slidably engaging with each of said frame members.

6. In a roof structure for the driver's seats of tractors and the like, in combination, a pair of spaced arcuate frame members of identical curvature, said frame members consisting of tubular stock and disposed in parallel planes; and a roof member comprising guide means slidably engaging with each of said frame members, said guide means comprising pairwise arranged rollers of such configuration as to engage the opposite sides of the respective frame member and to thereby prevent a separation of the roof member from said frame members.

7. In a roof structure for the driver's seats of tractors and the like, in combination, a pair of spaced arcuate frame members of identical curvature, said frame members disposed in parallel planes; and a windshield member comprising guide means slidably engaging with each of said frame members, said guide means comprising pairwise arranged rollers of elastic material engaging the opposite sides of the respective frame member to thereby prevent a separation of the roof member from said frame members, the arrangement of said frame members being such that the windshield member is movable to a position in which the seat is accessible from the front side of the tractor.

8. A roof structure for the driver's seats of tractors and the like, said structure comprising, in combination, a pair of spaced arcuate frame members of identical curvature, said frame members disposed in two parallel vertical planes; a roof member comprising first guide means slidably engaging with each of said frame members; and a windshield member connected with said roof member and comprising second guide means slidably engaging with each of said frame members, said first and second guide means comprising pairwise arranged rollers engaging the opposite sides of the respective frame member to prevent a separation of the roof member and windshield member from said frame members, the arrangement of said frame members being such that the windshield member is movable to a position in which the seat is accessible from the front side of the tractor.

9. In a roof structure for the driver's seats of tractors and the like, in combination, a pair of spaced arcuate frame members of identical curvature, each of said frame members extending along the periphery of a circle and said frame members disposed in parallel planes; and a windshield member comprising guide means slidably engaging with each of said frame members whereby the windshield member is shiftable along said frame members to a position in which the seat is accessible from the front side of the tractor.

10. In a vehicle having a longitudinal central plane of symmetry and comprising a driver's seat and a chassis, a roof structure comprising, in combination, a pair of arcuate frame members of identical curvature, said frame members disposed in parallel planes in mirror reverse with respect to said central plane at opposite sides of the seat and each having ends connected with said chassis; a roof member comprising guide means slidably engaging with said frame members for permitting a shifting of the roof member longitudinally of said frame members into and from a position above said seat; and a windshield member comprising guide means slidably engaging with said frame members for permitting a shifting of the roof and windshield longitudinally of said frame members to a position in which the seat is accessible from the front side of the vehicle.

References Cited in the file of this patent

UNITED STATES PATENTS

| 1,031,020 | Murphy | July 2, 1912 |
| 1,264,804 | Jacobs | Apr. 30, 1918 |
| 1,716,212 | Cushman | June 4, 1929 |
| 2,013,314 | Metz | Sept. 3, 1935 |
| 2,565,919 | Hill | Aug. 28, 1951 |
| 2,732,963 | Grubich | Jan. 31, 1956 |
| 2,943,885 | Fritzmeier | July 5, 1960 |

FOREIGN PATENTS

| 340,394 | Great Britain | Jan. 1, 1931 |